C. C. CRALEY.
METAL WORKING APPARATUS.
APPLICATION FILED MAR. 31, 1916.
1,217,572.
Patented Feb. 27, 1917.
2 SHEETS—SHEET 2.
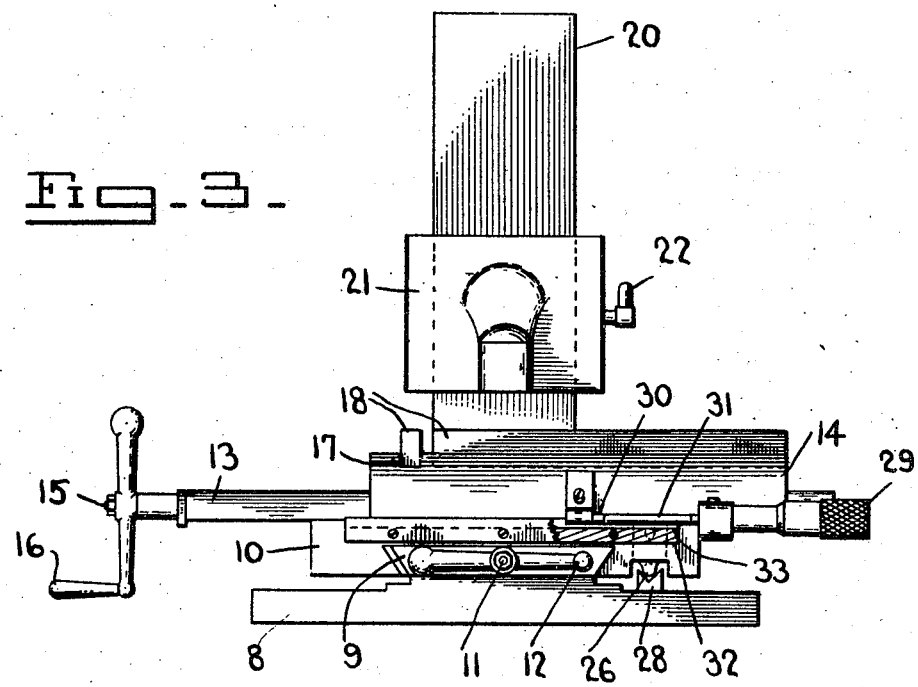
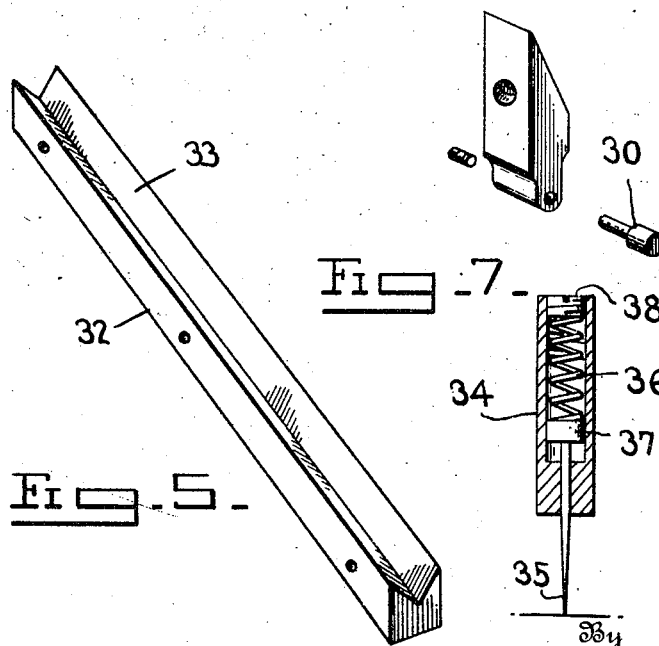
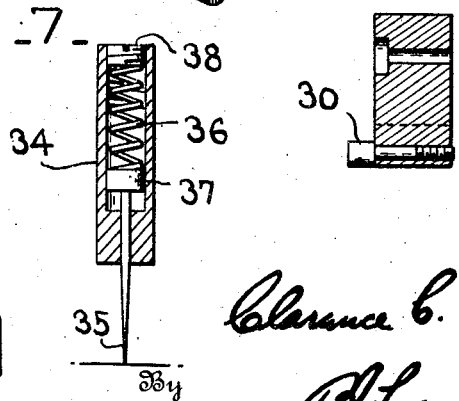
Inventor
Clarence C. Craley
By
Attorney

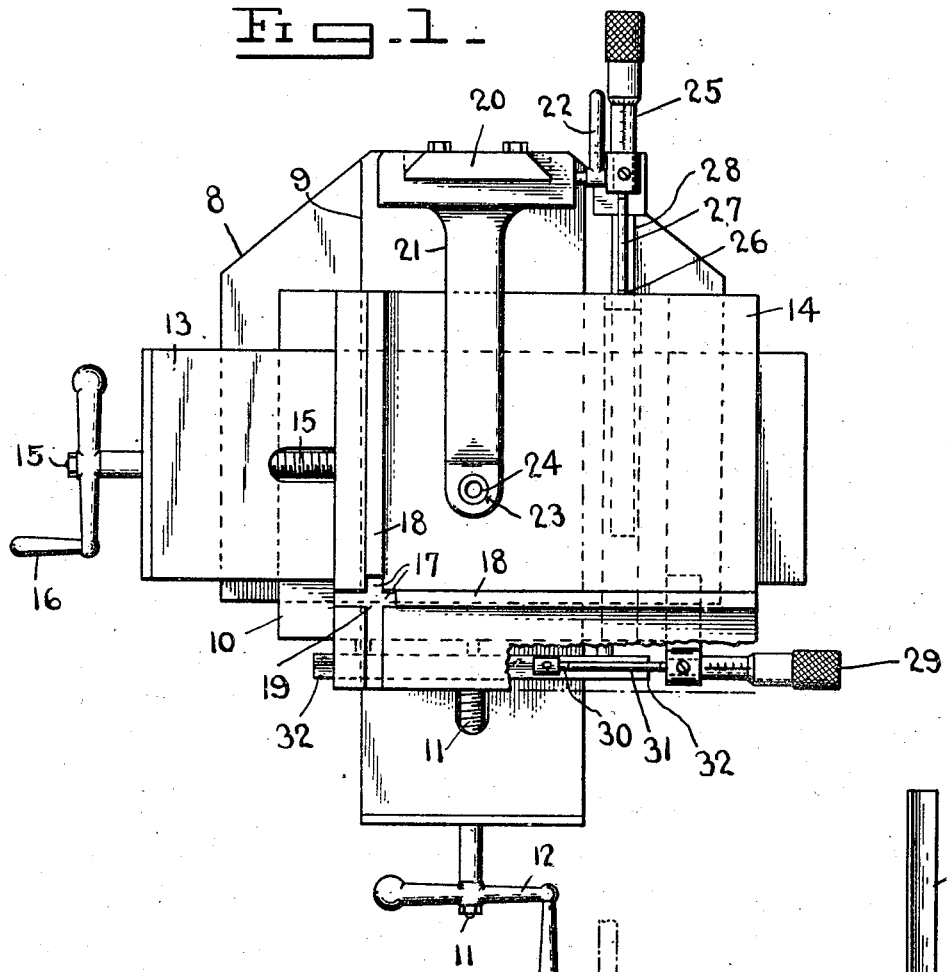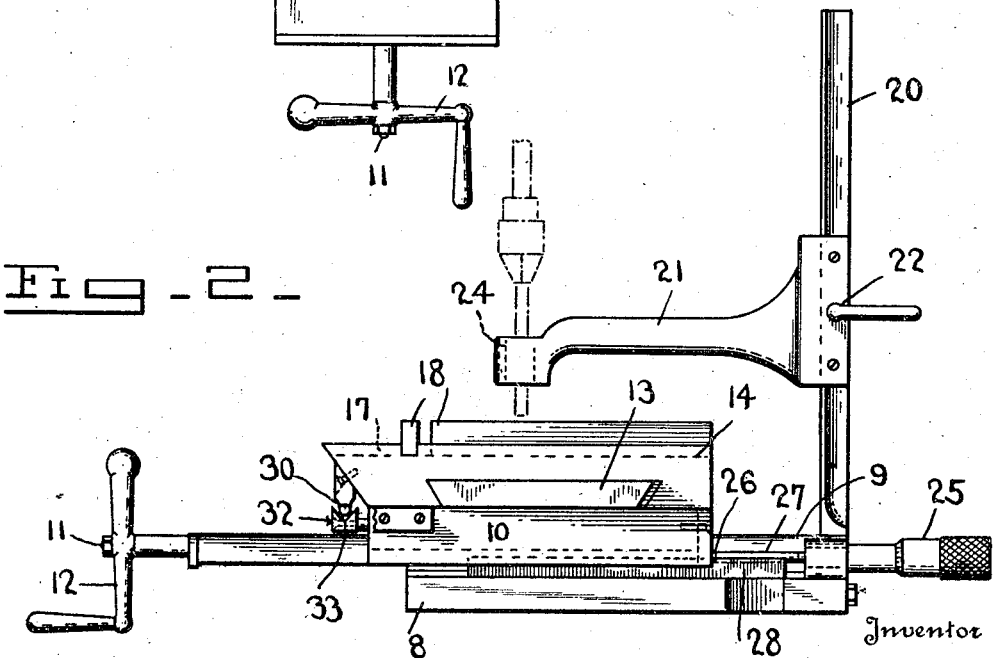

UNITED STATES PATENT OFFICE.

CLARENCE C. CRALEY, OF PARKESBURG, PENNSYLVANIA.

METAL-WORKING APPARATUS.

1,217,572.   Specification of Letters Patent.   Patented Feb. 27, 1917.

Application filed March 31, 1916. Serial No. 88,085.

*To all whom it may concern:*

Be it known that I, CLARENCE C. CRALEY, a citizen of the United States, residing at Parkesburg, in the county of Chester and State of Pennsylvania, have invented certain new and useful Improvements in Metal-Working Apparatus, of which the following is a specification.

The present invention relates to metal working apparatus of the type requiring the utmost accuracy, and is in the nature of an improvement on the Patent No. 1,007,185, granted to me on October 31, 1911.

One of the objects of the present invention is to provide means by which the work to be laid out or operated upon or inspected can be accurately positioned on the work holder or carried with relation to a certain point from which various measurements can be made with the utmost accuracy, together with means for positioning a tool, so that the relation of the tool can be absolutely determined with the utmost ease, and yet with absolute accuracy.

A further and important object is to provide in connection with gage mechanism an improved means for supporting the spacing elements so that they can be readily introduced and removed, this supporting means permitting the free movement of the co-acting gage elements to and from direct or intimate coacting relation.

An embodiment of the invention that is at present considered the preferable one is illustrated in the accompanying drawings, wherein:—

Figure 1 is a plan view of the apparatus.

Fig. 2 is a side elevation of the same.

Fig. 3 is a front elevation.

Fig. 4 is a detail perspective view of one of the gage stop elements.

Fig. 5 is a perspective view of the spacing element support.

Fig. 6 is a sectional view of the element shown in Fig. 4, with the parts assembled.

Fig. 7 is a detail sectional view through a type of scriber that may be employed.

Similar reference numerals designate corresponding parts in all the figures of the drawings.

In the embodiment illustrated, a base 8 is employed, having an upstanding dovetail guide 9 thereon, on which is slidably mounted a reciprocatory carriage 10. The usual screw shaft 11 is employed for moving the carriage 10 back and forth; said shaft having a handle crank 12 on its projecting end. The carriage 10, in turn, is provided with an upstanding dovetail guide 13 on which reciprocates a work carrying member 14, said member being moved back and forth by a screw shaft 15 of well known type, which is provided with a handle crank 16. It will thus be seen that the work carrying member 14 can be moved in directions at right angles to each other.

This work carrying member is provided along two of its margins and in its upper face with angularly disposed slots 17 in which are located stop plates 18, the adjacent ends of said stop plates being preferably spaced apart, and the corner 19 formed by the intersection of the slots being a starting point from which measurements can be made. This point for the purpose of clearness will hereinafter be designated as the "zero" point.

Projecting upwardly from the rear portion of the base 8, is a standard 20, on which is vertically slidable an arm 21 that overhangs the work carrying member 14, and can be held in different vertical positions on the standard by a suitable clamping screw 22. The free end of the arm 21 is provided with a vertical opening 23 therethrough, in which may be placed a bushing 24. The center of the opening 23 is a fixed point of the apparatus, and is never varied in any lateral direction, the vertical adjustment of the arm 21 being provided for the purpose of bringing said arm 21 as near as practicable to the work placed on the member 14.

Mounted on the rear portion of the base 8 is a micrometer 25, which may be of any well known type, and coacting with the inner end of the said micrometer, is a stop element 26 fixed to the carriage 10. It will be evident, therefore, that by turning the crank 16, and therefore the adjusting screw 15, the carriage 10 and consequently the work carrying member 14 can be moved back and forth and their distance from the "zero" position of the micrometer 25 can be easily determined by the adjustment of said micrometer. Assuming, however, that the micrometer has only a range of one inch, it will be evident that if the carriage is moved over an inch from the micrometer 25, it will be beyond the range thereof. In order that extensive adjustments may be made, standard spacing elements of different lengths may be interposed between the micrometer 25 and its coacting gage element 26, one of these spacing elements being shown at 27. The spacing elements are detachably supported on the base by means of a trough 28 carried by said base and having a V-shaped groove in its upper side. This trough, it will be noted, is disposed below the path of the stop element 26, or in other words said element is freely movable thereover or in the groove. When the spacing element is in place, however, said spacing element is supported by the trough between the micrometer 25 and its coacting gage element 26.

In like manner, a micrometer 29 is mounted on the carriage 10, and coacting therewith, is a stop element 30 supported on the work carrying member 14. Spacing elements, one of which is shown at 31, may be interposed between the micrometer 29 and element 30. These spacing elements are also supported in a trough 32 fixed upon the carriage 10, and having a V-shaped groove 33 in its upper side. The groove permits the free passage of the stop element 30 over the trough, but as will be clear by reference to Fig. 3, will support the element 31 between the micrometer 29 and the stop element 30.

The two micrometers 25 and 29 are so located upon the base 8 and carriage 10 respectively, that when they are at "zero" and their stop elements 26 and 30 are abutted thereagainst, the "zero" point 19 of the work carrying member will be alined with the axis of the opening 23 in the arm 21. It will thus be evident that by adjusting the work carrying member 14, in accordance with adjustments made on the micrometer, the position of the axis of the opening 23 in the arm 21 with respect to the "zero" point 19 can be determined exactly and with despatch, so that any desired measurements may be made on work positioned on the work holder, and this predetermined positioning of the work on the work holder can be easily accomplished because of the stops 18 and their relation to the "zero" point 19.

Any desired tool may be utilized, either for laying out work, or for operating on or inspecting the same. Thus, in Fig. 7 there is disclosed a scriber that can be introduced into the opening 23 in place of the bushing 24. This scriber consists of a casing 34 that will fit snugly in the opening 23 and is provided with a marking point 35 yieldingly urged downwardly by a spring 36 placed in the casing 34. The lower end of the spring bears upon a head 37 formed upon the upper end of the point 35 and the upper end of said spring is borne upon by an adjusting screw 38. In case a power-driven tool is to be employed, the mechanism may be located on a suitable machine table, and the tool passed through the opening 23, a bushing as 24 being employed for properly directing such tool. Thus, such an arrangement is indicated in dotted lines in Fig. 2.

From the foregoing, it is thought that the construction, operation and many advantages of the herein described invention will be apparent to those skilled in the art, without further description, and it will be understood that various changes in the size, shape, proportion and minor details of construction may be resorted to within the scope of the appended claims without departing from the spirit or sacrificing any of the advantages of the invention.

Having thus fully described my invention, what I claim as new, and desire to secure by Letters Patent, is:—

1. In apparatus of the character set forth, the combination with relatively movable supporting and work carrying members, of coacting gage elements carried respectively thereby, a spacing element adapted to be detachably interposed between the gage elements, and supporting means for the spacing element mounted wholly on one of the members and permitting the gage elements to be brought into intimate coacting relation.

2. In apparatus of the character set forth, the combination with relatively movable supporting and work carrying members, of coacting gage elements carried respectively thereby, a spacing element adapted to be detachably interposed between the gage elements, and fixedly mounted supporting means for the spacing element that permits the gage elements to be brought into intimate coacting relation.

3. In apparatus of the character set forth, the combination with relatively movable supporting and work carrying members, of coacting gage elements carried respectively thereby, a spacing element adapted to be detachably interposed between the gage elements, and supporting means for the spacing element mounted on one of the relatively movable members and arranged out of the path of movement of the gage element carried by the other member.

4. In apparatus of the character set forth, the combination with relatively movable supporting and work carrying members, of coacting gage elements carried respectively thereby, a spacing element adapted to be detachably interposed between the gage elements, and a support for the spacing element mounted on one of the relatively movable members and having a seat to receive the same, said support being arranged out of the path of movement of the gage element carried by the other member.

5. In apparatus of the character set forth, the combination with relatively movable supporting and work carrying members, of coacting gage elements carried respectively thereby, a spacing element adapted to be detachably interposed between the gage elements, and a supporting trough for the spacing element located on one of the members out of the path of the gage elements.

6. In apparatus of the character set forth, the combination with relatively movable supporting and work carrying members, of a micrometer gage element mounted on one of the members and a stop gage element mounted on the other, said elements being movable into and out of direct coacting relation, a fixed trough mounted on one of the members below the path of the gage element carried by the other member, and a spacing element arranged to rest in the trough and be thereby held between the gage elements.

7. In apparatus of the character set forth, the combination with a base, of a work carrying member mounted thereon and movable in two angular directions with respect thereto, means for moving the work carrying member in said directions, means on the work carrying member for locating the work in a predetermined position thereon, and sets of coacting gage elements mounted respectively on the base and work carrying member for determining the position of the work carrying member and the work positioned thereon when moved in said angular directions.

8. In apparatus of the character set forth, the combination with a base and a tool positioning device, of a work carrying member mounted on the base and movable in two angular directions with respect thereto and the tool positioning device, means for moving the work carrying member in said directions, means on the work carrying member for locating the work in a predetermined position thereon, and sets of coacting gage elements mounted respectively on the base and work carrying member for determining the position of the work carrying member and the work positioned thereon with respect to the tool positioning device when said member is moved in said angular directions.

9. In apparatus of the character set forth, the combination with a base and a tool positioning device, of a work carrying member mounted on the base and movable in two angular directions with respect thereto, said work carrying member having a predetermined "zero" point thereon that moves therewith to different positions with respect to the tool positioning device, sets of coacting gage elements mounted respectively on the base and work carrying member for determining the position of the "zero" point with relation to the tool-positioning device, upon the movement of the work carrying member in each of said angular directions, and means for moving the work carrying member.

10. In apparatus of the character set forth, the combination with a base, of a reciprocatory carriage mounted thereon, means for moving the carriage, a work carrying member mounted on the carriage and movable thereon in an angular direction to the direction of movement of the carriage, means for thus moving the work carrying member, said work carrying member having a "zero" point thereon, means for positioning the work in a predetermined relation with respect to said "zero" point, means overhanging the work carrying member for positioning a tool, a micrometer and a coacting stop element respectively mounted on the base and carriage for determining the position of the tool with respect to the "zero" point upon the movement of the work in one direction, and a micrometer and a coacting stop element mounted respectively on the carriage and work carrier for determining the position of the work with respect to the tool when the carriage is moved in an angular direction.

In testimony whereof, I affix my signature in the presence of two witnesses.

CLARENCE C. CRALEY.

Witnesses:
H. WILSON,
H. K. BEECHER.